United States Patent [19]
Storey et al.

[11] Patent Number: 5,785,349
[45] Date of Patent: Jul. 28, 1998

[54] ELONGATED ASYMMETRICAL AUTOMOTIVE AIRBAG

[75] Inventors: J. Kirk Storey, Farmington; Brent K. Olson, Clearfield; Davin G. Saderholm, Salt Lake City, all of Utah

[73] Assignee: Morton International, Inc., Chicago, Ill.

[21] Appl. No.: 759,863

[22] Filed: Dec. 3, 1996

[51] Int. Cl.⁶ ............................................. B60R 21/16
[52] U.S. Cl. ............................................. 280/743.1
[58] Field of Search .................. 280/743.1, 730.2, 280/728.1

[56] References Cited

U.S. PATENT DOCUMENTS

| | | | |
|---|---|---|---|
| 3,791,667 | 2/1974 | Haviland | 280/150 AB |
| 4,010,055 | 3/1977 | Oka et al. | 280/743.1 |
| 4,966,388 | 10/1990 | Warner et al. | 280/730 |
| 5,022,675 | 6/1991 | Zelenak, Jr. et al. | 280/743.1 |
| 5,112,079 | 5/1992 | Haland et al. | 280/730 |
| 5,224,732 | 7/1993 | Warner et al. | 280/730 |
| 5,277,441 | 1/1994 | Sinnhuber | 280/730 R |
| 5,290,061 | 3/1994 | Bollaert | 280/743.1 |
| 5,316,336 | 5/1994 | Taguchi et al. | 280/730 A |
| 5,324,072 | 6/1994 | Olson et al. | 280/730 A |
| 5,498,030 | 3/1996 | Hill et al. | 280/743.1 |
| 5,501,489 | 3/1996 | Folsom et al. | 280/743.1 |
| 5,529,340 | 6/1996 | Fairbanks | 280/728.1 |
| 5,531,470 | 7/1996 | Townsend | 280/730.2 |
| 5,536,038 | 7/1996 | Bollaert et al. | 280/743.1 |
| 5,566,977 | 10/1996 | Wipasuramonton | 280/743.1 |
| 5,570,900 | 11/1996 | Brown | 280/730.2 |
| 5,636,860 | 6/1997 | Fischer et al. | 280/730.1 |
| 5,678,853 | 10/1997 | Maly | 280/730.2 |
| 5,697,640 | 12/1997 | Lalonde | 280/743.1 |

FOREIGN PATENT DOCUMENTS

| | | | |
|---|---|---|---|
| 4314347 | 11/1993 | Germany | 280/743.1 |
| 9111345 | 8/1991 | WIPO | 280/743.1 |

*Primary Examiner*—Charles T. Jordan
*Assistant Examiner*—Theresa M. Wesson
*Attorney, Agent, or Firm*—George W. Rauchfuss, Jr.

[57] ABSTRACT

A side-impact airbag is essentially tubular and formed from two substantially identical panels. One of the panels is shortened, as by pleating and stitching. The resulting airbag, when inflated, has a unique assymetrical shape which minimizes any tendency to slap against a vehicle's occupant.

18 Claims, 2 Drawing Sheets

ELONGATED ASYMMETRICAL AUTOMOTIVE AIRBAG

TECHNICAL FIELD

This invention relates to the field of automotive airbags. More specifically, it is directed to an asymmetrical airbag particularly useful for side impact installations.

BACKGROUND ART

It is well known to deploy driver's side airbags in the steering wheels of motor vehicles. Such bags generally deploy as an oblate spheroid positioned to receive the face and head of the driver upon a frontal collision. Similarly, passenger side airbags are generally larger and are designed to protect a front seat passenger even if the passenger is somewhat out of position. Currently a number of airbag installations are either available or under development which are designed to protect the motor vehicle occupants from side impact collisions. In one such development, the airbag is mounted within the upholstery of a seat back. Upon inflation, the airbag bursts through a seam in the upholstery and extends forwardly as a tubular cushion along the occupant's side to absorb the force of a collision to prevent injury. However, one problem with such an installation is that the airbag, in rapidly expanding, slaps with considerable force against the occupant as well as against the side of the vehicle. This in and of itself may be sufficient to inflict injury.

Accordingly, it is a primary object of the present invention to provide a side impact airbag having a unique shape which, upon inflation, minimizes the slapping force against the occupant while retaining the ability to provide maximum side impact protection. Other objects, features, and advantages will become apparent from the following description and appended claims.

DISCLOSURE OF INVENTION

The invention comprises an elongated asymmetrical side impact airbag having a unique "banana" shape and a method for manufacturing such a bag. Two substantially identical panels are sewn together to form a tubular bag with an open mouth at one end, the sewing being done in a single work plane for maximum sewing efficiency and to avoid gathering along the seam. Thereafter, the area of one of the panels is reduced as by forming and sewing pleats. The resulting bag is then turned inside out, or "everted," and the mouth is connected to an inflator. The bag is positioned such that upon inflation the shortened panel faces the occupant.

BEST MODE FOR CARRYING OUT THE INVENTION

Figure 1:
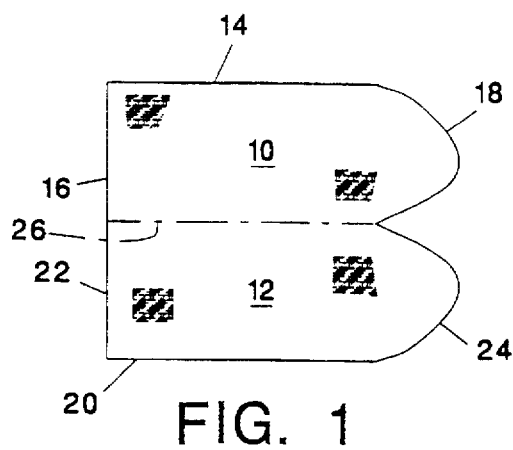
FIG. 1 illustrates a cut out pattern for the airbag of the invention.

FIGS. 1–6 illustrate the construction of an airbag in accordance with this invention. Conventional airbag fabric or similar bag material is cut as illustrated in FIG. 1 in the form of a first panel 10 and a second panel 12. The panels are elongated. The panel 10 has a free longitudinal edge 14, a straight first end 16, and a rounded second end 18. Similarly, the second panel 12 is defined by a free longitudinal edge 20, a straight first end 22, and a rounded second end 24. The panels are substantially mirror images of each other about a centerline 26 which forms a common longitudinal edge. This expedient of joined panels minimizes the number of subsequent sewing steps. However, the panels could be independent of one another.

Figure 4:
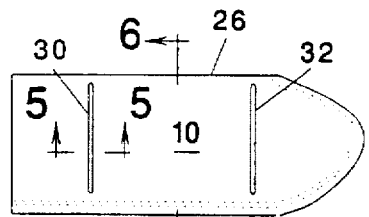
FIG. 4 is a view sinilar to FIG. 2 illustrating a further step in manufacturing the airbag.
Figure 5:
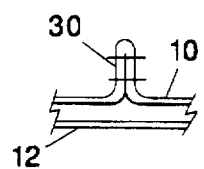
FIG. 5 is an enlarged cross-section taken substantially along the line 5—5 of FIG. 4.
Figure 2:
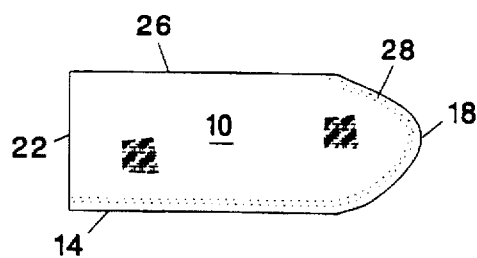
FIG. 2 illustrates a first step in manufacturing an airbag in accordance with the invention.
Figure 6:
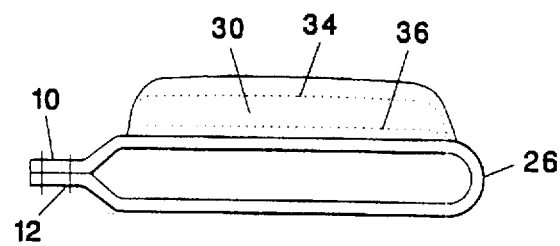
FIG. 6 is an enlarged cross-section taken substantially along the line 6—6 of FIG. 4.
Figure 3:
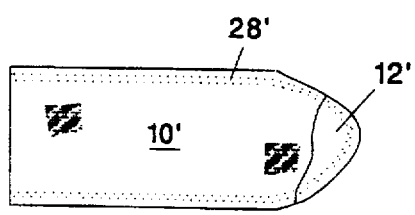
FIG. 3 is a view similar to FIG. 2, but partially broken away, illustrating a modification of the invention.

In a first step of airbag manufacture, the first panel 10 is folded over the second panel 12 along the common longitudinal edge 26. A double line 28 of stitching which is non-rupturable during deployment joins the second ends 18, 24 and the free longitudinal edges 14, 20 as illustrated in FIG. 2, thereby forming a tubular bag having a mouth defined by the first ends 16, 22. (If two independent panels 10', 12' are used, the stitching 28' is extended, as shown in FIG. 3 along both longitudinal edges.) The next step in the bag manufacture is to gather the material of the first panel 10 into one or more pleats 30, 32 as shown in FIG. 4. Representative pleats are illustrated in enlarged cross sections in FIGS. 5 and 6 Each of the pleats so formed is secured by double lines 34, 36 of stitching which is also non-rupturable during deployment. The effect of the pleating is to shorten the first panel 10 relative to the second panel 12. As viewed in FIGS. 5 and 6 each pleat is vertical and perpendicular to the surface of the first panel 10. However, this is not a necessary configuration as the pleat could be formed substantially on the surface of the panel. Also as viewed in FIG. 4, the pleats 30, 32 are substantially perpendicular to the common longitudinal edge 26. However, the only requirement is that the pleat take up material in the longitudinal direction. Accordingly the phrase "substantially perpendicular" is to be interpreted as including any alignment which would accomplish that purpose.

After the foregoing steps, the completed bag 38 is turned inside out, or everted, such that the pleats 30, 32 are on the inside of the bag so as not to interfere with deployment and to provide a relatively smooth outer surface for contact with a vehicle occupant. The mouth of the bag 38 as defined by the first ends 16, 22 is completed in accordance with standard prior art procedures for subsequent connection to the inflator of an airbag module. As these procedures are conventional, they need not be further described herein.

Figure 7:
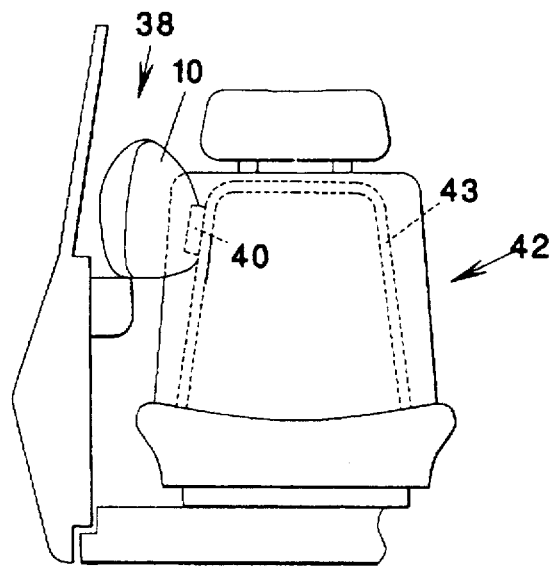
FIG. 7 is a front view of an automotive seat with an airbag in accordance with the invention deployed therefrom.
Figure 8:
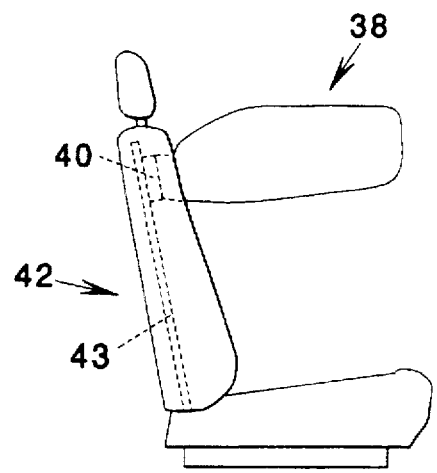
FIG. 8 is a side view of the seat and airbag of FIG. 7.
Figure 9:
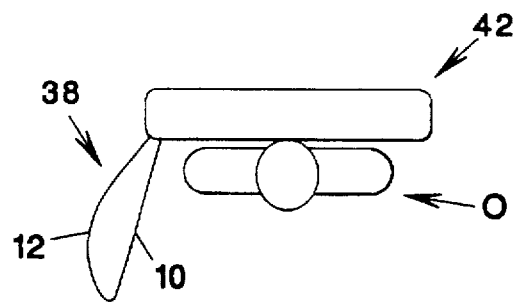
FIG. 9 is a top view illustrating the relationship between the seatback, airbag, and occupant.

FIGS. 7–9 disclose the operation of the airbag 38 from a module 40 housed within the seat back 42, mounted on its supporting frame 43. Upon inflation, the bag bursts through a portion of the upholstery seam of the seat back as previously explained and is so oriented that the shortened first panel 10 is adjacent the body of an occupant O. As best illustrated in FIG. 9, the constraint provided by the shortened first panel 10 causes the airbag to assume a unique "banana" shape which tends to avoid contact with the occupant while maintaining the proper position for safely cushioning the occupant against a side impact.

As a result of its unique construction, the airbag is able to deploy around the occupant during inflation, instead of against the occupant. This enables the airbag to be packaged, or mounted, deeper, or further back, into the internal seat structure and thereby reduces or eliminates the slap generally associated with deployment of a side-impact airbag. This reduction or elimination of slap is especially significant and important on side impacts since the injury criteria are based on peak acceleration, or the rate at which the airbag deploys, rather than the peak energy developed during airbag deployment.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. The method of manufacturing an automotive airbag which comprises:

providing first and second substantially identical elongated panels of airbag material, each having a first end, a second end, and first and second longitudinal edges;

non-rupturably securing said first and second panels together by joining their respective first longitudinal edges, second longitudinal edges, and second ends to form a substantially tubular bag;

gathering the material of said first elongated panel into at least one pleat substantially perpendicular to one of said joined longitudinal edges;

non-rupturably securing each of said at least one pleats to effectively shorten said first elongated panel relative to said second elongated panel; and everting said bag.

2. The method of claim 1 wherein said securing steps comprise stitching.

3. The method of claim 1 wherein said at least one pleat comprise a plurality of pleats.

4. The method of claim 3 wherein said securing steps comprise stitching.

5. The method of manufacturing an automotive airbag which comprises:

providing a single sheet of airbag material in the form of first and second elongated panels, each having a first end, a second end, and a free longitudinal edge, said panels being joined in mirror imagery about a centerline forming a common longitudinal edge;

folding said first elongated panel over said second elongated panel at said centerline such that the first end, second end, and free longitudinal edge of said first panel overlie the corresponding first end, second end, and free longitudinal edge of said second panel;

non-rupturably securing the first and second panels together along said overlying free longitudinal edges and said second ends to form a substantially tubular bag;

gathering the material of said first elongated panel into at least one pleat substantially perpendicular to said common longitudinal edge;

non-rupturably securing each of said at least one pleat to effectively shorten said first elongated panel relative to said second elongated panel; and everting said bag.

6. The method of claim 5 wherein said securing steps comprise stitching.

7. The method of claim 5 wherein said at least one pleat comprise a plurality of pleats.

8. The method of claim 7 wherein said securing steps comprise stitching.

9. An automotive airbag comprising:

first and second elongated panels formed from a single sheet of airbag material in mirror imagery about a common longitudinal edge, each panel having a first end, a second end, and a free longitudinal edge;

means non-rupturably securing together the second ends of both panels;

means non-rupturably securing together the free longitudinal edges of both panels to form a tubular bag having a mouth defined by the first ends of said first and second panels;

at least one pleat formed in said first panel substantially perpendicular to said common longitudinal edge; and means non-rupturably securing each of said at least one pleat, whereby said first panel is shortened relative to said second panel to form an asymmetrical tubular airbag upon inflation through said mouth.

10. The airbag of claim 9 wherein said securing means comprises stitching.

11. The airbag of claim 9 wherein said at least one pleat comprises a plurality of pleats.

12. The airbag of claim 11 wherein said securing means comprises stitching.

13. The airbag of claim 12, wherein said airbag is a side-impact airbag.

14. An automotive airbag comprising:

first and second substantially identical elongated panels of airbag material, each panel having a first end, a second end, a first longitudinal edge, and a second longitudinal edge;

means non-rupturably securing together the second ends of both panels;

means non-rupturably securing together the first longitudinal edges of both panels;

means non-rupturably securing together the second longitudinal edges of both panels to form a tubular bag having a mouth defined by the first ends of said first and second panels;

at least one pleat formed in said first panel substantially perpendicular to one of said longitudinal edges; and means non-rupturably securing each of said at least one pleat, whereby said first panel is shortened relative to said second panel to form an asymetrical tubular airbag upon inflation through said mouth.

15. The airbag of claim 14 wherein said securing means comprises stitching.

16. The airbag of claim 14 wherein said at least one pleat comprises a plurality of pleats.

17. The airbag of claim 16 wherein said securing means comprises stitching.

18. The airbag of claim 17 wherein said airbag is a side-impact airbag.

* * * * *